Dec. 13, 1938.    A. E. HART    2,140,050
PHOTOGRAPHING APPARATUS
Filed July 10, 1937    2 Sheets-Sheet 1
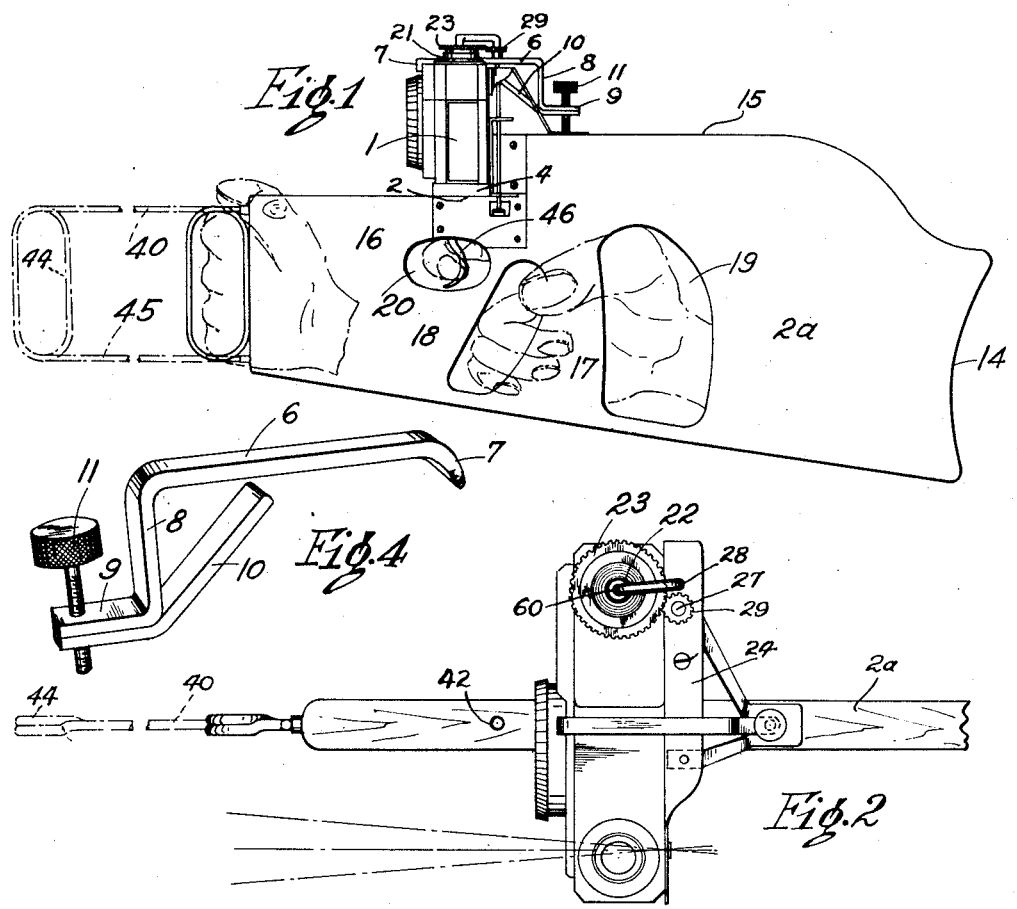
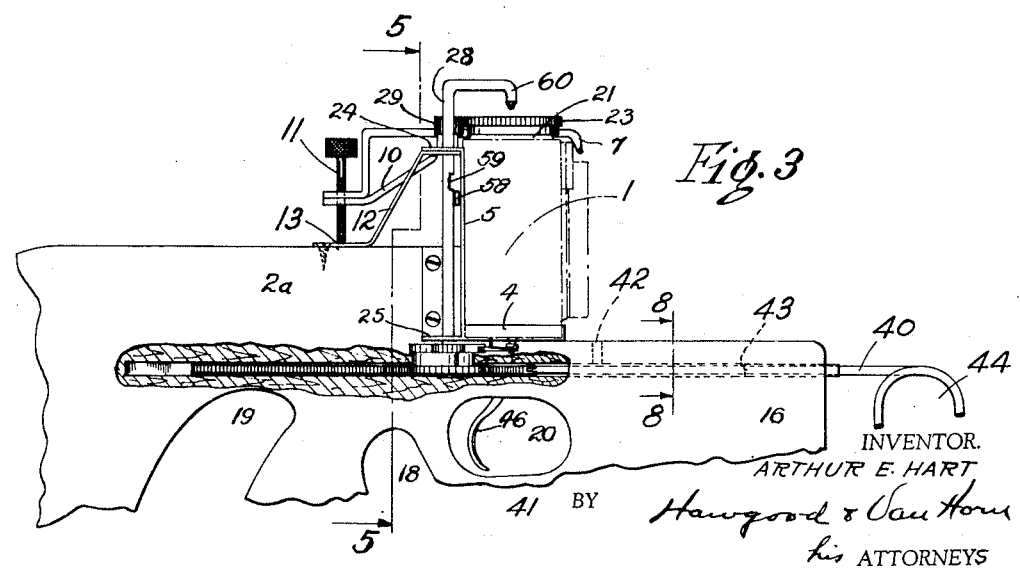
INVENTOR.
ARTHUR E. HART
BY Haygood & Van Horn
his ATTORNEYS Dec. 13, 1938.   A. E. HART   2,140,050
PHOTOGRAPHING APPARATUS
Filed July 10, 1937   2 Sheets-Sheet 2
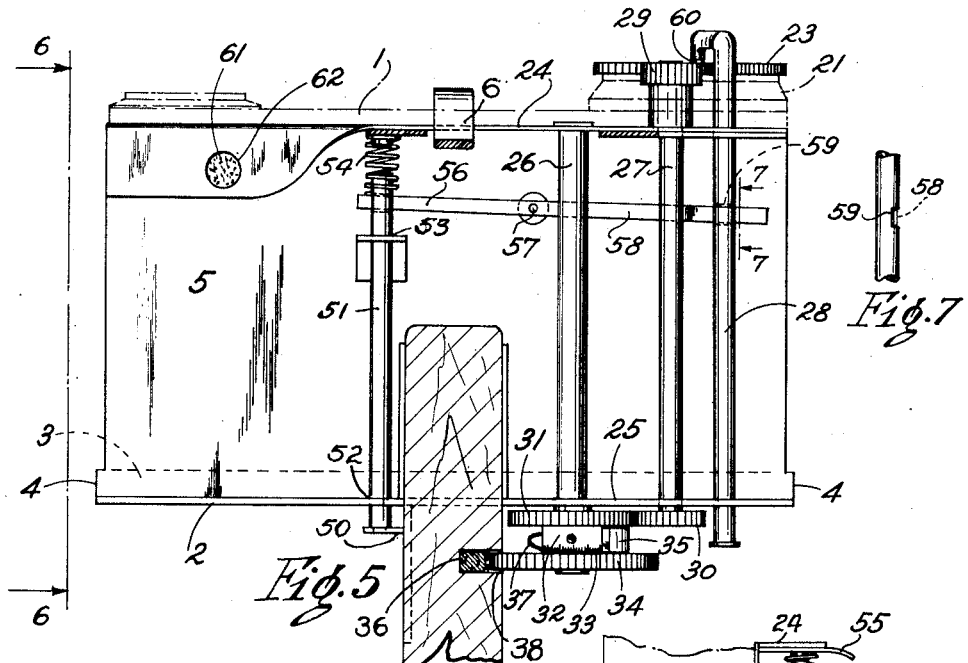
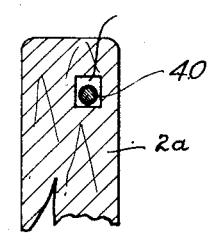
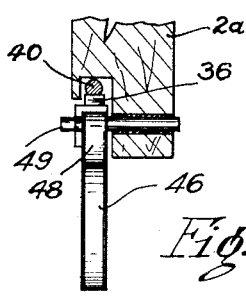
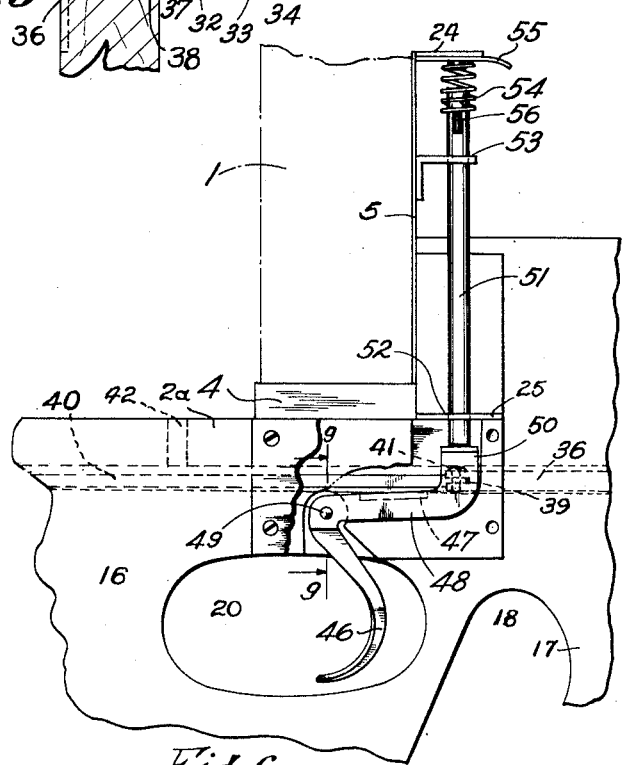
INVENTOR.
ARTHUR E. HART
BY Hawgood & Van Horn
his ATTORNEYS Patented Dec. 13, 1938

2,140,050

UNITED STATES PATENT OFFICE 2,140,050

PHOTOGRAPHING APPARATUS

Arthur E. Hart, Cleveland, Ohio

Application July 10, 1937, Serial No. 153,039

13 Claims. (Cl. 95—31)

My invention is an improvement in photographing apparatus, and relates more particularly to mounting a camera, preferably of the roll film type, upon a gun stock or similar support having means associated therewith for operating the camera shutter and for advancing the film across the field of exposure after each complete shutter operation.

It is one of the objects of my invention to mount a camera upon a support or rest similar in some respects to a gun stock, so that the camera and support may be operated quickly and conveniently without interference with the use of the camera mounted sight or finder.

Another object of my invention is to provide a mounting of this type which is extremely simple in construction and easy to operate and which affords positive control over the camera in use.

A further object of the invention resides in the provision of a camera support which is adapted to be handled in a manner similar to that of handling a gun or rifle and which is provided with means operable in the support for advancing the film in the camera after each exposure.

A still further object of the invention is to provide means for automatically preventing release of the trigger to operate the camera shutter during the operation of the repeating mechanism.

Another object is to so mount the camera on a gun stock or the like that the finder of the camera may be brought close to the eye of the operator and further to provide a shoulder and cheek rest for the operator in use.

Other objects and advantages of my invention will become more apparent from the following description of an embodiment thereof, reference being made to the accompanying drawings in which like reference characters are employed to designate like parts throughout the same.

In the drawings:

Figure 1 is a side elevation of a device embodying my invention and shows the same in use;

Figure 2 is a top plan view of the device shown in Figure 1;

Figure 3 is a fragmentary view of the device taken from the side opposite that shown in Figure 1;

Figure 4 is a detailed perspective view of a form of clamping member for removably clamping the camera to the stock;

Figure 5 is a view partly in section taken on line 5—5 of Figure 3;

Figure 6 is taken in the direction of line 6—6 of Figure 5;

Figure 7 is a view taken in the direction of line 7—7 of Figure 5;

Figure 8 is a section on line 8—8 of Figure 3; and

Figure 9 is a section taken on line 9—9 of Figure 6.

I am aware that attempts have been made heretofore to mount cameras in various ways upon gun or rifle barrels, but such mountings have necessitated the use of complicated tripping mechanism for actuating the camera shutter and have, in every instance to my knowledge, precluded the use of the camera carried finder or sight.

In carrying out my invention, I have provided a camera support shaped and constructed in a manner resembling a gun stock, but which possesses several advantages more fully appearing in the following description. I have also provided simple shutter actuating and repeater mechanism associated with the gun stock and the camera mounted thereon, so that the entire device presents a simple, convenient, compact, and easily operable unit.

Referring now more particularly to the embodiment of my invention illustrated in the accompanying drawings, the camera is indicated generally at 1. In the device shown the camera is of the so-called "candid" camera type, and due to its compactness is easily removably mounted on a plate 2 carried on the rest 2a having upstanding flanges 3 and 4 along its front edge and side edges respectively to aid in properly positioning the camera on the support. A back plate 5 extends upwardly from the base plate 2 and forms with the plate 2 and flanges 3 and 4 a rigid support or receptacle for the camera 1.

In order to removably secure the camera in the receptacle or support, I have provided a form of removable clamp shown in detail in Figure 4, but it is to be understood that while I have provided an illustration of a form of clamp, I do not wish to be limited to the details of construction of such a clamp, since various forms of similar clamps may be used to perform the identical function intended.

The form of clamp shown in the drawings comprises a strap like member 6 which is bent at one extremity as at 7 to embrace the forward wall of a camera. The strap is bent downwardly at its opposite end 8 and then outwardly at 9. A positioning arm 10 extends upwardly and forwardly of the portion to engage the plate 5. A clamping screw 11 operates in the members 9 and 10 and is adapted to engage the base of the brace member 12 at 13. When the screw is turned to engage the brace at 13, the portion 7 of the clamp will be drawn rearwardly to securely hold the camera in the receptacle or support 5.

The main support for the camera comprises a stock member 2a which may be fashioned from wood or metal in any suitable manner. This supporting member or rest 2a includes a rear concave portion 14 shaped to comfortably abut the shoulder of the user. Forwardly of this portion is a cheek rest 15 which is formed in an elevated position with respect to the shoulder rest and which extends forwardly to the back plate 5 which is mounted thereon. Forwardly of the cheek rest the support 2a terminates in an extended portion 16.

I have provided a novel grip for comfortably holding the rest 2a which greatly contributes to the control of the operator over the camera, especially in the rapid making of successive exposures or in keeping a fast moving object within the field of the camera lens.

The grip is provided by a downwardly extending rigid portion 17 formed by the voids or openings 18 and 19, and is shaped to comfortably fit the clenched palm of the user's hand, the opening 18 accommodating the fingers while the opening 19 receives the thumb and a portion of the wrist as illustrated in Figure 1.

A trigger guard is formed by the opening 20 also formed in the rest adjacent the opening 18 and into this projects the trigger or release. The trigger finger of the user is insertable within the guard to operate the trigger as shown.

The camera rest 2a is preferably formed of wood and is elongated and preferably flat in general. The thickness of the rest is sufficient to provide a comfortable, well balanced support, and at the same time to house certain camera operating mechanism, as will presently be more fully described.

As explained above, the camera illustrated in the drawings is of the "candid" camera type and the following description will be confined to this type of camera insofar as the shutter and film advancing mechanism is concerned, although it is to be understood that other types of cameras may be used with my invention without departing from the scope of the appended claims or the spirit of this invention.

Cameras of the above type usually are provided with an internal mechanism which, when properly operated, provide motive power for the shutter at various predetermined speeds. Associated with this mechanism is means for advancing the film in successive steps across the field of exposure. I wish to make it clear that I do not claim as my invention the specific shutter and film advancing mechanism per se, such as is found in these cameras, my invention having to do among other things, more particularly with the camera support and certain means for actuating the shutter operating and film advancing means all externally of the camera.

The shutter and film winding mechanisms within the camera terminate externally in a knob or the like 21, which has driving connection with a concentric shaft 22 to simultaneously operate, advance the film and tension or load the shutter preparatory to taking a picture when the knob is turned in one direction. The shaft is also operable axially against the compression of a spring to release the shutter.

Now, in accordance with my invention, I provide simple compact means carried by the stock 2a to actuate the knob in one direction for advancing the film and for simultaneously loading the shutter. In further carrying out my invention a ring gear 23 is fitted to the knob 21 to turn the same when the gear is rotated.

The back plate 5 is provided with rearwardly extending flanges 24 and 25 along its upper and lower extremities respectively and these are apertured in alignment to receive the shafts 26 and 27 and the plunger 28.

The shaft 27 extends through each of the flanges and may be rotated therein. A pinion 29 is keyed to the upper end of the shaft 27 and its teeth mesh with the chamfered teeth of the ring gear 23. A pinion 30 is keyed to the opposite end of the shaft and its teeth mesh with the teeth of the larger pinion 31 keyed to the lower end of the shaft 26. A clutch consisting of a collar 32 keyed to the shaft 26 and having serrations 33 around its periphery and a pawl 35 pivotally carried by the pinion 34 which is freely rotatable on the shaft 26, is provided to transmit rotative motion in one direction to the shaft 27 and pinion 29 from the reciprocating rack 36. The pawl is actuated by the spring 37 to engage the serrations 33 and rotate the shaft 26 when the pinion 34 is rotated by the rack in one direction, but rides over the serrations when the pinion 34 is rotated in the opposite direction.

The rack 36 is mounted to slide longitudinally within the body of the stock 2a and is entirely enclosed therein, there being an opening 38 in the stock to admit a part of the periphery of the pinion 34 for meshing engagement with the teeth of the rack.

The forward end of the rack is slotted at 39 to receive the end of the upper slide rod 40 and the rod and adjacent rack end are removably secured together by means of a screw 41, there being an opening in the stock at 42 to facilitate removal of the screw when the latter is brought into register with the opening.

A stop 43 is provided in the forward end of the stock to limit forward travel of the slide 40. As will be seen from Figure 3, the bifurcated end of the rack will abut the stop 43 when the rod is pulled outwardly of the stock.

The slide 40 may comprise a rod looped at 44 to provide a hand grip as shown in Figure 1 and includes a lower parallel rod 45 which slides in a channel formed in the lower portion of the stock 2a.

Movement of the slide 40—45 and the rack 36 carried thereby, forwardly of the front end of the stock 2a actuates the knob 21 to set or load the shutter mechanism prior to its release, and also to advance the film strip into position for the next exposure.

Movement of the slide in the opposite direction to the full line position in Figure 1 must be completed, however, before the trigger 46 can be pulled by the operator. It is to be noted that I have provided a safety lock which prevents release of the camera shutter through the trigger operated mechanism unless the slide 40—45 is returned to the full line position in Figure 1. This safety mechanism includes a flange 47 formed inwardly of the trigger arm 48 and extending into the path of movement of the rack 36.

As long as any portion of the rack overlies the flange 47, the trigger 46 cannot be depressed, since to do so would require an upward movement of the arm 48 about the pivot 49. Such upward movement is prevented, as shown in Figures 6 and 9 by the engagement of the flange 47 with the lower part of the rack.

However, when the slide 40—45 is returned fully to the full line position in Figure 1, the rack ceases to engage or directly overlie the flange 47. There being sufficient clearance between the lower wall of the rod 40 and the upper surface of the flange 47, the trigger now is free to be depressed to swing in a counterclockwise direction in Figure 6.

I have provided a simple shutter releasing mechanism which is actuated by the trigger. The trigger arm 48 terminates in an upward extension 50 upon which normally rests the rod 51. The rod 51 operates vertically in bearings 52 and 53 and is normally thrust downward into engagement with the portion 50 by means of a compression spring 54 coaxial with the upper end of the rod and abutting the flange or plate 55 and the end 56 of the lever pivoted at 57 to the back plate of the support. The lever includes another arm 58 which extends to the right in Figure 5 and normally lies in a seat or detent 59 formed in the plunger 28. This is illustrated in detail in Figure 7. As seen in this figure, the arm 58 of the lever may be flexed to the dotted line position thus permitting the plunger to be lifted sufficiently high to disengage the end 60 from the shutter release member 22. See also Figure 3. The camera then may be removed from the support or receptacle by loosening the screw 11 and removing the clamp 6.

In the operation of my invention, the camera is supplied with the usual roll of film and is placed in the holder or receptacle carried on the stock. The clamp 6 is placed in position and tightened by turning the screw 11. The plunger is turned in its bearings so that its end 60 will engage the shutter release 22 when the plunger is dropped to the position shown in Figure 5 and the arm 58 of the actuating lever is in the depression 59.

In order to advance the film to be exposed and to set the shutter for release, the operator may grasp the handle 44 of the slide 40—45 in his left hand and place his right hand on the grip 17 as shown. Outward movement of the slide 40—45 causes the gear 34 to rotate and, through the pawl clutch 35 and 33, rotate the gears 31 and 30. Since the gear 30 is keyed to the shaft 27, rotational movement is communicated to the gear or pinion 29 and the ring gear 23 mounted on the knob 21. By virtue of the pawl clutch 33—35, opposite movement of the slide 40—45 can be accomplished without imparting movement to the knob 23.

Assuming the above operation is completed as described, the shutter of the camera may now be released at any time, because the rack 36 does not now overlie the stop flange 47 of the trigger arm 48.

With the shoulder rest 14 abutting the shoulder of the operator in the manner similar to that of a gun stock in use, the user rests his cheek upon the rest 15 of the stock 2a and points the stock and camera at the object to be photographed.

The sight or finder 61 of the camera may be viewed through the opening 62. When the object comes into view of the finder, the operator pulls the trigger 46, thus lifting the rod 51 and rocking the lever arms 56 and 58 about the pivot 57 in a clockwise direction in Figure 5. The plunger rod 28 is thus moved downwardly by the arm 58 to engage the end 60 of the plunger with the release button 22 of the camera shutter mechanism.

Thus, the exposure is made and the operation of the parts may be repeated quickly and easily for subsequent and successive exposures.

It will be seen from the above description that by my invention I have provided a very simple mechanism whereby the speed of making successive exposures on a film strip may be materially increased. I have found that by mounting the camera on a stock such as that illustrated in the drawings, better and more positive control may be had over the camera at all times and consequently the user is enabled to obtain a number of rapid successive exposures of fleet objects which would otherwise be less possible to obtain by other means.

Furthermore, by mounting the camera along the upper surface of the stock or support and close to the eye of the user, a more perfectly balanced device is provided.

The repeating mechanism is simple and positive in operation and enables the user to prepare the camera for successive exposures without permitting the object being photographed to be lost, even temporarily, in the finder.

Various changes may be made in the details of construction of my invention without departing from the spirit thereof or the scope of the appended claims.

I claim:

1. A support for a camera comprising a stock, a receptacle carried by the stock for removably receiving a camera, a clamp for rigidly securing the camera in the receptacle, and means slidable out of one end of the stock and forwardly of the camera and having positive driving connection with the camera shutter mechanism for loading the shutter.

2. A support for a camera comprising a stock, a receptacle carried by the stock for removably receiving a camera, a clamp for rigidly securing the camera in the receptacle, means slidable out of one end of the stock and forwardly of the camera and having positive driving connection with the camera shutter mechanism for loading the shutter, and means carried by the stock for releasing said loaded shutter mechanism.

3. A support for a camera comprising a stock, a receptacle carried by the stock for removably receiving a camera, a clamp for rigidly securing the camera in the receptacle, and means carried by the stock and having positive driving connection with the camera shutter mechanism for loading the shutter, means carried by the stock for releasing said loaded shutter mechanism, and a stop operable by said first named means for preventing the release of the loaded shutter mechanism during the cycle of operation of said first named means.

4. A photographing apparatus including a stock support, a camera mounted on the top thereof, shutter loading means telescoping the stock and a trigger release for the shutter, said shutter loading means including a member reciprocable out of the forward end of the stock and forwardly of the camera, a gear train operable by said member and having driving connection with the camera shutter mechanism.

5. A photographing apparatus including a stock support, a camera mounted on the top thereof, shutter loading means telescoping the stock and a trigger release for the shutter, said shutter loading means including a member reciprocable out of the forward end of the stock and forwardly of the camera, a gear train operable by said member and having driving connection with the camera shutter mechanism, and a clutch for transmitting motion through the gear train when the loading means is slid in but one direction.

6. A photographing apparatus including a stock like support, a camera removably supported on the top thereof, a clamp for anchoring the camera on the support, the forward portion of said stock extending beyond the camera mounted on the stock, a trigger mechanism associated with the camera shutter releasing mechanism, and film advancing means, said last named means including a member telescoped within the forward end of the stock, a rack slidable by said member, a ring gear on said camera and transmission gearing connecting said ring gear with said rack.

7. A photographing apparatus including a stock like support, a camera removably supported on the top thereof, a clamp for anchoring the camera on the support, the forward portion of said stock extending beyond the camera mounted on the stock, a trigger mechanism associated with the camera shutter releasing mechanism, and film advancing means, said last named means including a member telescoped within the forward end of the stock, a rack slidable by said member, a ring gear on said camera and transmission gearing connecting said ring gear with said rack, and a clutch intermediate the rack and gearing.

8. A photographing apparatus including a stock like support, a camera removably supported on the top thereof, a clamp for anchoring the camera on the support, the forward portion of said stock extending beyond the camera mounted on the stock, a trigger mechanism associated with the camera shutter releasing mechanism, and film advancing means, said last named means including a member telescoped within the forward end of the stock, a rack slidable by said member, a ring gear on said camera and transmission gearing connecting said ring gear with said rack, said trigger being held inoperable by said rack when said rack is in any other than one of its extreme positions in the stock.

9. In a photographing apparatus a stock, a camera removably mounted on top of the stock and means slidable in said stock and having connection with said camera to load the camera shutter, and a trigger carried by the stock having connection to release the loaded shutter, said slidable means having a portion overlying said trigger for locking engagement therewith to prevent operation of the trigger when the slidable means is in any other than one of its extreme limits of movement in the stock.

10. The combination with a camera of a support for the camera comprising a stock, and camera actuating means carried by the stock, said camera being removably securely attached to the stock along the top portion thereof, a portion of said stock extending forwardly of the camera, and a slide operable along said extended portion of the stock to operate said camera actuating means.

11. The combination with a camera of a support for the camera comprising a stock, and camera actuating means carried by the stock, said camera being removably securely attached to the stock along the top portion thereof, a portion of said stock extending forwardly of the camera, and a slide operable along said extended portion of the stock to operate said camera actuating means, said slide having a loop formed in its forward extremity to provide a hand grip.

12. The combination with a camera of a support for the camera comprising a stock, and camera actuating means carried by the stock, said camera being removably securely attached to the stock along the top portion thereof, a portion of said stock extending forwardly of the camera, and a slide operable along said extended portion of the stock to operate said camera actuating means, said slide having a loop formed in its forward extremity to provide a hand grip, and a stop member carried by the stock to limit its motion outwardly of the stock.

13. The combination with a camera of a support for the camera comprising a stock, means for removably attaching the camera to the upper part of the stock, camera actuating means carried by the stock and a pair of hand grips associated with the camera actuating means, one of said grips being carried at the forward end of the stock and forwardly of the camera.

ARTHUR E. HART.